Nov. 22, 1960  D. D. CRAWFORD  2,960,850
SHIELD FOR A POWER TAKE-OFF
Filed Nov. 4, 1959
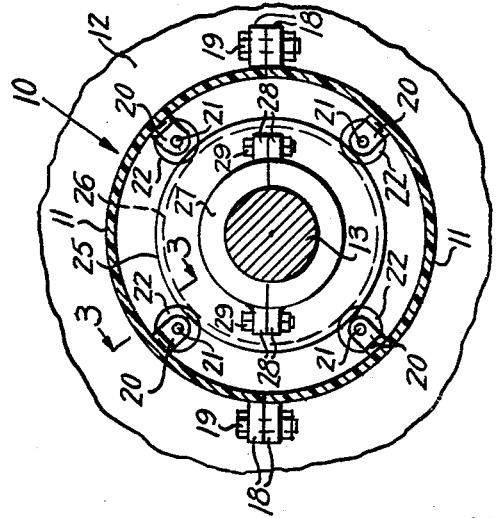
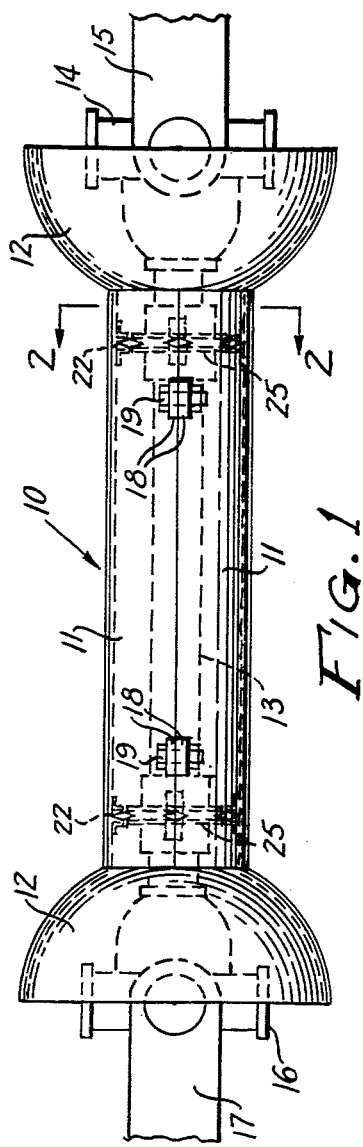
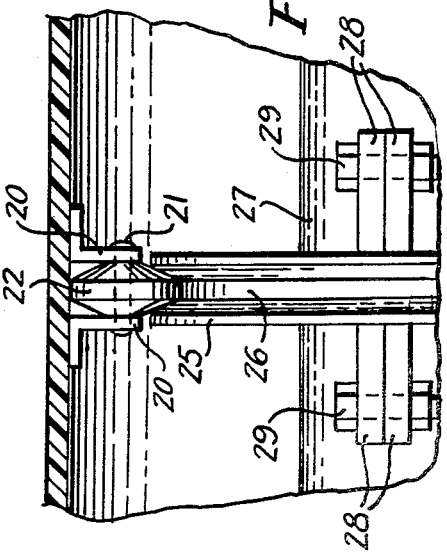
INVENTOR
DONALD D. CRAWFORD
BY
Kimmel & Crowell
ATTORNEYS United States Patent Office 2,960,850
Patented Nov. 22, 1960

2,960,850
SHIELD FOR A POWER TAKE-OFF
Donald D. Crawford, Oto, Iowa
Filed Nov. 4, 1959, Ser. No. 850,850
1 Claim. (Cl. 64—3)

This invention relates to a shield for the power take-off of a vehicle and the associated universal joints and drive shafts, and has particular applicability to such a shield for the drive shaft and power take-off of farm machinery, wherein an operating unit is attached thereto.

A primary object of the invention is the provision of such a shield which will serve to protect the drive shaft and its associated universal, and at the same time preclude injury to individuals employing such machinery, by covering the moving and operating parts of the device and preventing the entanglement of clothing, or hands or fingers therein.

A very important object of the invention is the provision of such a housing which is comprised of two equal halves, which are clamped together around the shaft, and which may be readily removed and applied for the purpose of cleaning or greasing the machinery, or for coupling and uncoupling various units of machinery, or for replacing on a different vehicle.

An additional object of the invention is the provision of such a device which is provided with interior bearings, adapted to be employed in association with bearing races which are clamped about the drive shaft, so that no interference with the operation of the mechanism is affected.

Still another object of the invention is the provision of such a device which may be readily assembled and disassembled without the use of any tools other than a screwdriver or the like.

A further object of the invention is the provision of a shield of this character which may be made either of metal or a durable plastic, and which may be constructed with a minimum of effort, difficulty and expense.

Still other objects reside in the combinations of elements, arrangements of parts, and features of construction, all as will be more fully pointed out hereinafter and disclosed in the accompanying drawing wherein there is shown a preferred embodiment of this inventive concept.

In the drawing:

Figure 1 is a side elevational view of one form of shield or cover for a power take-off, and its associated universal joints and drive shaft, the latter being indicated in dotted lines;

Figure 2 is an enlarged sectional view taken substantially along the line 2—2 of Figure 1 as viewed in the direction indicated by the arrows;

Figure 3 is an enlarged sectional view taken substantially along the line 3—3 of Figure 2, as viewed in the direction indicated by the arrows.

Similar reference characters refer to similar parts throughout the several views of the drawing.

Having reference now to the drawing in detail, there is generally indicated at 10 the shield or cover of the instant invention. This shield comprises two identical complementary half-sections 11 of tubular construction, each of which may be provided at each end with a flared bell-shaped half-section 12. The device is adapted to fit over the drive shaft 13 of a piece of farm equipment, which is connected at one end by a universal joint 14 to the power take-off shaft 15 of a conventional tractor or other device, and at its other end is connected by a universal joint 16 to the driving shaft 17 of a piece of farm machinery.

The two separable half-sections 11 are adapted to be connected together in any desired manner, and one simple form of connection is the provision of a pair of opposed ears 18 at suitable spaced intervals along the edge of each section, the ears being apertured for the reception of clamping bolts 19. Any other suitable means for connecting the sections may be employed.

It is to be understood that under certain circumstances the bell-shaped members 12 may be omitted, as, for example, when the tube is of sufficient diameter to encompass the universal joints 14 and 16. Under such circumstances the cylindrical tube may be hinged along one side.

Positioned internally of the tubular portions 11 adjacent each end thereof are a pair of depending bracket members 20, apertured to receive an axle 21, upon which is mounted a roller bearing 22. In the illustrative embodiment of the invention herein shown, the roller bearing is peripherally tapered, although other types of bearings may be employed if desired.

Any desired number of these bearings may be employed, although it has been found practicable to employ two bearings for each half-section at each end thereof. The bearings 22 are adapted to seat in bearing races 25, which are grooved, as at 26, to accommodate the tapered bearings 22. Each bearing race 25 includes a hub 27, which is split, and provided with extending ears 28 which are apertured to receive bolts 29 for clampingly engaging the hub and its associated bearing race about the drive shaft 13.

Obviously, when the device is in use the bearings 22 and the bearing races 25 are suitably aligned, so that the drive shaft 13 and its associated mechanism is enabled to rotate smoothly within the housing 10, the latter being also free to rotate thereon, in case of becoming entangled with or engaged by any extraneous object.

From the foregoing it will now be seen that there is herein provided an improved shield or cover for the power take-offs of farm machinery, and their associated universal joints and drive shafts, which accomplishes all of the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative, and not in a limiting sense.

I claim:

In combination with a drive shaft of a power take-off for a vehicle, a cover, said cover being comprised of opposed complemental semi-cylindrical sections, means for securing said sections in related assembly about said drive shaft, spaced bearings carried interiorly of each semi-cylindrical section, and bearing races cooperable with said bearings clampingly engaged about said drive shaft, said bearings comprising tapered roller bearings, said bearing races having tapered grooves therein to receive said tapered bearings, spaced pairs of inwardly extending lugs positioned interiorly of each semi-cylindrical position, and axles extending between said lugs for mounting said roller bearings.

References Cited in the file of this patent
UNITED STATES PATENTS

| | | |
|---|---|---|
| 600,375 | Podeyn | Mar. 8, 1898 |
| 1,012,909 | Podeyn | Dec. 26, 1911 |
| 2,796,749 | Warner | June 25, 1957 |
| 2,911,803 | Weasler | Nov. 10, 1959 |
| 2,923,140 | Weasler | Feb. 2, 1960 |

FOREIGN PATENTS

| | | |
|---|---|---|
| 23,051 | Great Britain | Aug. 1, 1907 |